Dec. 19, 1922.
T. H. SIMPSON.
FOOT ACCELERATOR.
FILED FEB. 19, 1921.
1,439,194.
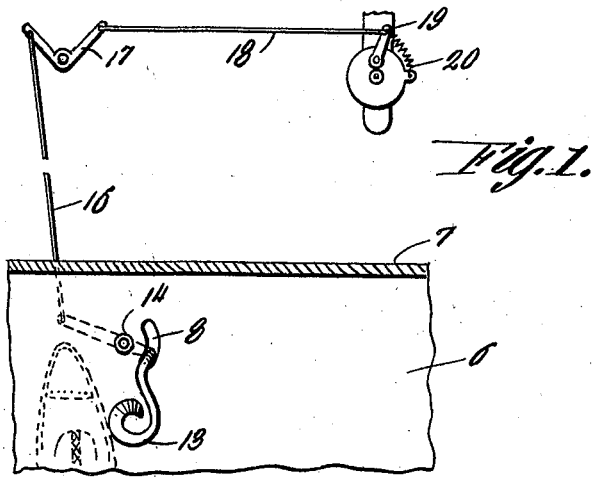
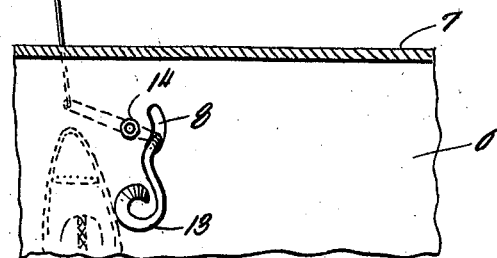
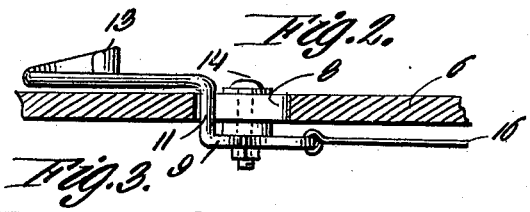
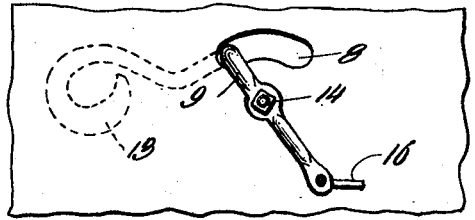
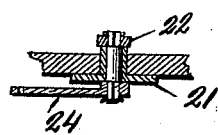
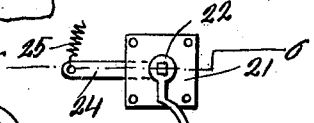
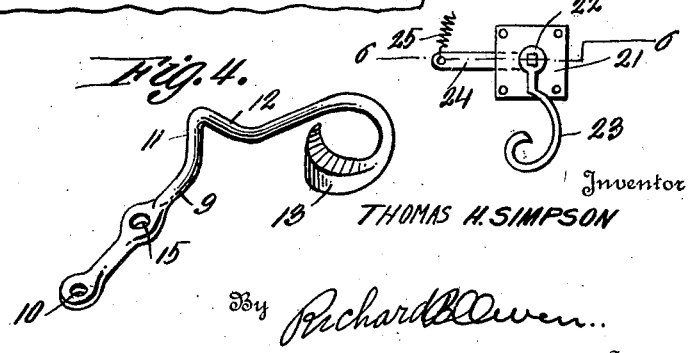
WITNESSES
Inventor
THOMAS H. SIMPSON
By Richard B. Owen
Attorney Patented Dec. 19, 1922.

1,439,194

UNITED STATES PATENT OFFICE.

THOMAS H. SIMPSON, OF DETROIT, MICHIGAN.

FOOT ACCELERATOR.

Application filed February 19, 1921. Serial No. 446,336.

*To all whom it may concern:*

Be it known that I, THOMAS H. SIMPSON, a citizen of the United States, residing at Detroit, in the county of Wayne and State of Michigan, have invented certain new and useful Improvements in Foot Accelerators, of which the following is a specification.

This invention relates to foot accelerators and is adapted for use on motor vehicles.

The principal object of this invention is to provide an accelerator which is movable by lateral movement of the foot to permit engagement of the foot of the operator with the floor board of the vehicle, thereby eliminating intermittent impulses on the accelerator pedal which is undesirable as is well known in the art.

A further object of this invention is to provide a simple type of accelerator which may be conveniently attached to any standard type of motor vehicle and is readily operable by lateral movement of the operator's foot so as to open the fuel valve to the carburetor at the same time insuring automatic reclosing of the valve as soon as pressure is released from the accelerator pedal.

The above and other objects of this invention will be in part described and in part understood from the following description of the present preferred embodiment of the invention taken in connection with the accompanying drawings, wherein:

Fig. 1 is a top plan view of an accelerator constructed in accordance with this invention illustrating its application.

Fig. 2, is a side elevation view thereof showing a part removed.

Fig. 3, is a bottom plan view of the device illustrating its application and showing a part removed.

Fig. 4, is a perspective view of the accelerator pedal per se

Fig. 5, is a top plan view of a slightly modified form, and

Fig. 6 is a fragmentary sectional view of the form of invention illustrated in Fig. 5.

In the drawings, in order to illustrate the application of my invention a portion of a vehicle is shown consisting of a floor board 6 which has upstanding from the front thereof in the usual way a dash board 7. The floor board is provided with an arcuate slot 8 arranged adjacent the dash board 7.

My invention consists especially of an accelerator pedal or lever 9, which is formed from a strand of metal, one end 10 of which is flattened and provided with an aperture. An intermediate portion of said strand is bent upwardly at right angles as indicated at 11, is then bent laterally at right angles to the portion 11, as indicated at 12, and ultimately terminates in a substantially circular abutment 13. The abutment 13 is enlarged so as to provide a relatively high arcuate surface for contact with the side of the shoe of the operator.

A bolt 14 extends through the foot board of the vehicle in proximity to the arcuate slot 8 and engages an opening 15, which latter is formed approximately midway between the aperture 10 and the right angled portion 11 of the pedal. The bolt 14 serves as an axis upon which the pedal is movable. The right angle portion 11 extends upwardly through the slot 8, while the foot abutting portion 13 of the pedal extends slightly above the floor board 6 as shown to advantage in Fig. 2. The aperture 10 is engaged by one end of a rod 16, which later has its opposite end engaged with one end of a bell crank lever 17. The bell crank lever 17 may be pivoted at any desired point on the engine block, chassis of the vehicle or the like, and is engaged with a rod or link 18. The link 18 engages the carburetor valve 19, the latter being normally held in a closed position by a spring 20.

If desired, a plate 21 may be mounted upon the lower face of the floor board 6 and bolted or otherwise engaged therewith. A squared shaft 22 extends upwardly through said plate 21 and foot board 6 and is engaged at its upper end by a foot pedal 23, which is similar to the portion of the foot pedal indicated by the numerals 12 and 13 in the form of the invention shown in Figs. 1 to 4. A link 24 has one of its ends engaged with the lower end of the squared shaft 22, which link is in turn engaged by one end of a spring 25 or the like, which is engaged with the carbureter valve in a manner similar to that shown in Fig. 1 of the drawings.

In use of this device it will be apparent that pressure laterally upon the portion 13 of the pedal will cause the latter to be moved through the slot 8. By making the abutment 13 of an arcuate configuration, the latter will better conform to the shape of the foot and be thereby more easily operated by the foot without the necessity of raising the latter or of even bodily moving the latter from its position on the floor board. Merely a pivotal movement of the foot will cause operation of the accelerator in an obvious manner. As soon as pressure is released from the abutment 13 the latter will reassume its normal position in view of the spring 20.

Various changes may be made by me in this device especially in the details of construction, proportion and arrangement of parts without departing from the spirit and scope of the invention as covered by the appended claims.

What is claimed is:

1. An accelerator pedal for motor vehicles including a strand of metal pivoted upon the bottom face of the floor board of the vehicle and having one end thereof in connection with the carburetor of the vehicle, the opposite end of said strand being extended upwardly through the floor board, enlarged and bent into an arcuate configuration to form an abutment operable by a pivotal movement of the foot of the user to permit movement of said pedal through a partial or a complete cycle of movement at the option of the user.

2. An accelerator pedal for motor vehicles including a single length of metal, one end of which is in connection with the carburetor valve of the vehicle and the opposite end extended upwardly through an arcuate slot in the floor board of the vehicle, the portion of said length above the floor board being enlarged for convenient engagement with the side of the foot of the operator of the vehicle and being bent into an arcuate configuration to permit complete movement of said length from one end of the slot to the other by a pivotal movement of said operator's foot.

In testimony whereof I affix my signature in presence of two witnesses.

THOMAS H. SIMPSON.

Witnesses:
P. C. GREINER,
EVALINE PEARL DANIELSON.